United States Patent
Sloat

(10) Patent No.: US 10,044,175 B1
(45) Date of Patent: Aug. 7, 2018

(54) HIGH TEMPERATURE AVIONIC LINE REPLACEABLE UNITS AND AIRCRAFT SYSTEMS CONTAINING THE SAME

(71) Applicant: HONEYWELL INTERNATIONAL INC., Morris Plains, NJ (US)

(72) Inventor: Jeffrey Sloat, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/664,219

(22) Filed: Jul. 31, 2017

(51) Int. Cl.
| | |
|---|---|
| H02B 1/26 | (2006.01) |
| H02B 1/28 | (2006.01) |
| H01R 13/631 | (2006.01) |
| H01R 13/52 | (2006.01) |
| B64D 43/00 | (2006.01) |

(52) U.S. Cl.
CPC ........... H02B 1/26 (2013.01); H01R 13/5219 (2013.01); H01R 13/631 (2013.01); H02B 1/28 (2013.01); B64D 43/00 (2013.01)

(58) Field of Classification Search
CPC combination set(s) only.
See application file for complete search history.

(56) References Cited

U.S. PATENT DOCUMENTS

| | | | |
|---|---|---|---|
| 5,032,692 A | | 7/1991 | DeVolder |
| 5,298,045 A | * | 3/1994 | Whitson ............ B01D 46/0013 55/385.6 |
| 5,402,319 A | * | 3/1995 | Shumaker ............ H05K 7/1404 211/41.17 |
| 5,464,461 A | * | 11/1995 | Whitson ............ B01D 46/0002 55/480 |
| 5,725,622 A | * | 3/1998 | Whitson ................ B01D 46/00 361/695 |
| 6,350,130 B1 | * | 2/2002 | Eller ..................... G01R 31/008 439/61 |
| 6,450,822 B1 | * | 9/2002 | Eller .................. H01R 13/6315 439/247 |
| 6,574,020 B1 | * | 6/2003 | Ovens .................... B64D 43/00 398/139 |

(Continued)

FOREIGN PATENT DOCUMENTS

KR 100923999 B1 10/2009

*Primary Examiner* — Lisa Lea Edmonds
(74) *Attorney, Agent, or Firm* — Lorenz & Kopf, LLP

(57) ABSTRACT

Avionic LRUs having increased temperature tolerances and other desirable properties are provided, as are aircraft systems containing such high temperature avionic LRUs. In one embodiment, the avionic LRU includes at least one microelectronic device and an LRU housing, which contains an enclosed cavity in which the microelectronic device is located. The LRU housing further includes an electrically-routed housing wall having an inner principal surface or frontside, which partially bounds the enclosed cavity and to which the microelectronic device is bonded or attached. The avionic LRU further includes a first LRU connector interface having a first LRU terminal array. The first LRU terminal array projects from the LRU housing and is electrically coupled to the microelectronic device through the electrically-routed housing wall. The LRU connector interface is configured to matingly engage the receptacle connector interface to support LRU operation when the LRU is removably mounted to the avionic LRU receptacle.

20 Claims, 4 Drawing Sheets

(56) References Cited

U.S. PATENT DOCUMENTS

| | | |
|---|---|---|
| 7,651,878 B2 | 1/2010 | Ryu |
| 2003/0018840 A1* | 1/2003 | Chandler ............... H01R 29/00 710/100 |
| 2010/0292870 A1* | 11/2010 | Saint Marc ............ B64D 31/00 701/3 |
| 2012/0001322 A1 | 1/2012 | Liu et al. |

* cited by examiner

HIGH TEMPERATURE AVIONIC LINE REPLACEABLE UNITS AND AIRCRAFT SYSTEMS CONTAINING THE SAME

TECHNICAL FIELD

The present invention relates generally to aircraft and, more particularly, to avionic LRUs having increased temperature tolerances and other desirable properties, as well as to aircraft systems containing such high temperature avionic LRUs.

ABBREVIATIONS

The following abbreviations appear throughout this document:

AM—Additive Manufacturing or Additively Manufactured;
ASIC—Application Specific Integrated Circuit;
CAD—Computer Aided Design;
COTS—Commercial Off The Shelf;
FFF—Fused Filament Fabrication;
GTE—Gas Turbine Engine;
LRU—Line Replaceable Unit;
MCM—Multichip Module;
MEMS—Microelectromechanical Systems;
MES—Main Engine Start;
PWB—Printed Wiring Board;
RF—Radio Frequency;
SLA—Stereolithography;
SMD—Surface Mount Device;
wt %—weight percentage;
vol %—volume percentage; and
3D—three dimensional.

BACKGROUND

Modern aircraft are commonly equipped with relatively large numbers of LRUs; that is, modular aircraft components or packages, which contain microelectronic devices and which are designed for rapid, in-field replacement. A non-exhaustive list of aircraft components commonly implemented as LRUs includes: heat exchangers, oil and fuel pumps, cooling fans, various valves (e.g., surge control valves, fuel metering valves, and bleed air valves), starter motors, various sensors (e.g., temperature and pressure transducers), ignition control units, and engine control units. By virtue of their modular nature, avionic LRUs can be quickly replaced or interchanged on an as-needed basis during unplanned maintenance events. An unplanned maintenance event may occur when, for example, an aircraft engine fails to start or responds sluggishly during MES. Maintenance personnel may be dispatched to the aircraft to determine if proper engine operation can be restored by replacing an LRU involved in the MES procedure, such as the starter air valve or the air turbine starter in the case of an air-started engine. If maintenance personnel can determine that a particular LRU is likely at fault, the LRU may be replaced and MES may be reattempted. In many cases, such actions can rapidly restore aircraft operation with minimal downtime to reduce operational costs, improve on-time delivery, and avoid flight cancellation. Avionic LRUs thus serve a vital role in aircraft design and operation.

Avionic LRU failures occur for a variety of reasons. In many cases, avionic LRU failures stem from structural compromise of electrical interconnections between the electrically-active components of the LRU, such as the LRU connector terminals and the microelectronic devices housed within the LRU. Such interconnection failures are often solder-related and may occur due to solder migration or crack formation in the presence of the elevated temperatures, repeated thermal cycling, and high vibratory loads typical of the avionic environment. In certain instances, high temperature solders can be utilized to help mitigate such LRU failure modes, but often contain lead and may provide only a modest increase in the overall temperature tolerances of the LRU. Furthermore, the inclusion of PWBs and other organic components may also place undesirable temperature constrains on LRU operation and may detract from LRU reliability over repetitive and pronounced thermal cycling conditions; e.g., in the case of engine controls, it is not uncommon for an LRU to be subjected to repeated thermal cycling with peak temperatures approaching 175° C. and minimum temperatures approaching −55° C. Due, at least in part, to such temperature limitations, LRU-containing aircraft systems are commonly designed to remotely locate avionic LRUs from local high temperature environments, which adds undesired cost and complexity to the aircraft system.

There thus exists an ongoing industry demand for avionic LRUs capable of operating within the high temperature, high vibratory aircraft environment over prolonged periods of time and across repeated thermal cycles with enhanced reliability. In addition to providing failure-resistant high temperature operation, it would be desirable for such high temperature avionic LRUs to be amenable to manufacture in an efficient manner and at production costs comparable to, if not less than those associated with the manufacture of conventional LRUs. Finally, it would be desirable for such high temperature LRUs to further have relatively compact, lightweight, and structurally-robust constructions; and, in at least some instances, to provide additional flexibility in LRU interconnection schemes and the overall modularity of LRU-containing aircraft systems. Embodiments of such high temperature LRUs and LRU-containing aircraft systems are provided herein, as are methods for manufacturing such high temperature avionic LRUs. Other desirable features and characteristics of embodiments of the present invention will become apparent from the subsequent Detailed Description and the appended Claims, taken in conjunction with the accompanying drawings and the foregoing Background.

BRIEF SUMMARY

Avionic LRUs having increased temperature tolerances and other desirable properties are provided. Embodiments of the avionic LRU are removably mountable or attachable to an avionic LRU receptacle, which includes a receptacle connector interface having a receptacle terminal array. In one embodiment, the avionic LRU includes at least one microelectronic device and an LRU housing, which contains an enclosed cavity in which the microelectronic device is located. The LRU housing further includes an electrically-routed housing wall, such as ceramic substrate on which or in which electrically-conductive interconnect features are formed. The electrically-routed housing wall has an inner principal surface or frontside, which partially bounds the enclosed cavity and to which the microelectronic device is bonded. The avionic LRU further includes a first LRU connector interface containing a first LRU terminal array. The first LRU terminal array is electrically coupled to the microelectronic device through the electrically-routed housing wall and projects from the LRU housing, possibly extending from the electrically-routed housing wall in a direction substantially opposite the microelectronic device. The LRU connector interface is configured to matingly engage the receptacle connector interface when the LRU is removably mounted to the avionic LRU receptacle such that corresponding terminals of the receptacle terminal array and the first LRU terminal array are placed in (e.g., electrical) communication.

In another embodiment, the avionic LRU includes a microelectronic device, an LRU housing enclosing a hermetically-sealed cavity in which the microelectronic device is located, and an LRU connector interface projecting from the LRU housing and having a LRU terminal array electrically coupled to the microelectronic device. A ceramic carrier contains electrical routing features, which electrically couple the microelectronic device to the LRU terminal array. The ceramic carrier forms a wall of the LRU housing and, in so doing, partially bounds the hermetically-sealed cavity to help preserve the sealed environment thereof. Additionally, in certain implementations, the ceramic carrier further includes an inner principal surface or frontside to which the microelectronic device is bonded, and an outer principal surface or backside opposite the inner peripheral surface, as taken along a centerline of the avionic LRU. The first LRU terminal array may project from the outer principal surface of the ceramic carrier, which may be exposed or visible from the exterior of the avionic LRU.

Embodiments of an LRU-containing aircraft system are further provided. In an embodiment, the LRU-containing aircraft system contains at least first and second avionic LRUs. The first avionic LRU includes a LRU housing containing an enclosed cavity and an electrically-routed housing wall, which bounds a portion of the enclosed cavity. A first microelectronic device is located or housed within the enclosed cavity and is mounted to the electrically-routed housing wall, perhaps utilizing a device bond layer that is essentially free of organic materials. The first avionic LRU further contains a first LRU terminal array, such as a multipin or multi-socket connector array, which is electrically coupled to the first microelectronic device through the electrically-routed housing wall. Similarly, the second avionic LRU includes a second microelectronic device and a second LRU terminal array. The second LRU terminal array matingly connects to or engages with the first LRU terminal array when the second avionic LRU is removably mounted to the first avionic LRU thereby electrically coupling the first and second microelectronic devices. Additionally, in certain embodiments, the first microelectronic device may assume the form of a semiconductor die on which control circuitry is formed, while second microelectronic device assumes the form of an avionic actuator or an avionic sensor.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
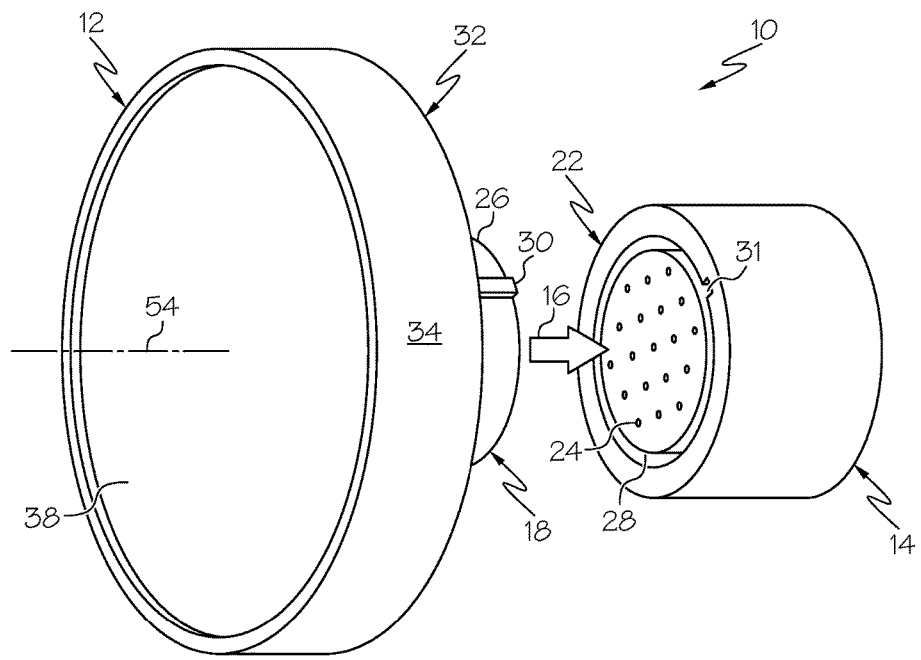
FIG. 1 is an isometric view of an LRU-containing aircraft system including a high temperature avionic LRU and a mating LRU receptacle, such as an aircraft harness connector or GTE pad, as illustrated in accordance with an exemplary embodiment of the present disclosure.

For simplicity and clarity of illustration, the drawing figures illustrate the general manner of construction, and descriptions and details of well-known features and techniques may be omitted to avoid unnecessarily obscuring the exemplary and non-limiting embodiments described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the disclosure.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Overview

The following describes avionic LRUs having increased temperature tolerances and other desirable properties, as well as aircraft systems containing such high temperature avionic LRUs. Embodiments of the below-described avionic LRUs are usefully produced for compatibility with existing LRU receptacles of the type present onboard civilian and military aircraft; the term "LRU receptacle," as appearing herein, referring to harness connectors, GTE pads, and other aircraft-side connector structures designed for mating connection with avionic LRUs in a manner supporting LRU operation. The LRUs described herein can contain any number and type of microelectronic components or devices for performing various different sensing, processing, and actuation tasks related to aircraft operation. Examples of such avionic LRUs and the tasks potentially performed thereby are described below. As appearing in the following description, the term "microelectronic device" refers to an electronic device, element, or structure produced on a relatively small scale and amenable to packaging within an LRU. Microelectronic components include, but are not limited to, semiconductor die carrying ICs, such as ASICs; MEMS die; passive electronic components, such as discrete resistors, capacitors, inductors, and diodes; optical devices;

and other small scale electronic devices capable of providing processing, memory, sensing, RF, optical, and actuator functionalities.

By conventional design, avionic LRUs often incorporate standardized, COTS connectors to enable connection with aircraft-side LRU receptacles. For example, a conventional LRU may contain a multipin connector, which is purchased from a supplier as a discrete, standardized component and which can be matingly inserted into a corresponding multisocket connector. In many cases, interconnection between the microelectronic device or devices housed within the LRU is achieved through wirebonds (or similar connections), which are formed between the connector terminals and one or more PWBs supporting the microelectronic devices. Solder connections are also commonly utilized to mount the packaged microelectronic devices to a PWB or a similar intervening routed structure, such as an interposer. Many of these features add undesired cost, complexity, and bulk to the LRU, and may introduce additional potential failure paths decreasing LRU reliability. As a specific example, conventional LRUs often contain PWBs composed of organic, hygroscopic materials, which may degrade when exposed to repeated, pronounced thermal cycling occurring over the operational lifespan of the LRU. Similarly, solder connections may be undesirably prone to gradual migration, crack formation and propagation, and other structural compromise when subject to prolonged high temperature operation and aggressive thermal cycling conditions characteristic of the aircraft environment.

In contrast to conventional LRUs, embodiments of the below-described avionic LRUs are capable of providing reliable, low failure operation within the high temperature, high vibratory aircraft environment. Embodiments of the avionic LRU may eliminate or reduce reliance on organic materials prone to degradation at highly elevated operational temperatures, such as temperatures approaching or exceeding 225° C. Components of the high temperature LRU may instead be joined utilizing hermetic bonding materials, which are predominately composed of inorganic materials by wt %; the term "hermetic bonding materials" referring to materials utilized to form a physical bond, as well as a hermetic seal (further defined below) between two interfaces or structures. Such hermetic bond materials can include metallic bonding materials (that is, bonding materials predominately composed of one or more metallic constituents by wt %), ceramic bonding materials (that is, bonding materials predominately composed of one or more ceramic constituents by wt %), glass bonding materials (that is, bonding materials predominately composed of one or more glass constituents by wt %), and combinations thereof. In certain instances, the hermetic bonding material may contain lesser amounts of organic materials. In other instances, the hermitic bonding materials may be essentially free of organic materials; the term "essentially free of organic materials" defined as containing less than 1% of organic materials, as considered by wt %. To provide a specific example, in implementations in which the avionic LRU includes an LRU housing to which a cover piece is joined to sealingly enclose an inner cavity within the housing, the cover piece may be bonded to the cover piece utilizing metallic bonding materials or, perhaps, utilizing an inorganic glass-based bonding material. The cover piece may be joined to the LRU housing in a manner creating a continuous 360°, high integrity (e.g., hermetic) seal preserving the internal environment of the LRU.

Embodiments of the avionic LRU further reduce reliance on organic materials, while reducing LRU size and part count by leveraging one or more wall of the enclosure or LRU housing to serve as a microelectronic device attachment and electrical interconnect structure. For example, in one implementation, a lower or base wall of the LRU housing may support one or more microelectronic devices contained in the LRU, while partly bounding a sealed cavity in which the microelectronic device(s) are located. Further, the LRU housing wall may be electrically-routed; that is, fabricated to include electrically-conductive routing features, such as metal traces and plated or filled vias, which are formed in the dielectric (e.g., ceramic) body of the housing wall. The microelectronic device or devices supported by the electrically-routed housing wall may be electrically interconnected with a terminal array, such as an array of electrically-conductive pins or sockets, projecting from an opposing surface of the housing wall. In this manner, PWBs and other organic-based substrates can be removed from the LRU architecture, in at least some embodiments, to further enhance the temperature capabilities of avionic LRU, while improving LRU reliability through the elimination of the high temperature failure paths associated with conventional LRUs.

In various embodiments of the avionic LRU, the LRU connector interface may further include one or more guide members configured to matingly engage corresponding guide members provided on an LRU receptacle. Such a guide member may assume the form of, for example, an annular flange or collar extending around or circumscribing the LRU terminal array. When the LRU is removably mounted to the LRU receptacle, the annular collar may be received within an annular depression or groove provided in the LRU receptacle in a close-fitting or mating relationship. Such features help provide a robust mechanical coupling between the avionic LRU and the LRU receptacle, while further ensuring that the terminals (e.g., pins or sockets) of the LRU terminal array properly engage the corresponding terminals (e.g., sockets or pins) of the LRU receptacle. Additionally, when present, the annular collar may be integrally formed with the LRU housing and, possibly, with the electrically-routed housing wall; e.g., the annular collar can be integrally formed with the LRU housing as a single ceramic piece created by machining of a ceramic block or utilizing a tape casting process, or utilizing a suitable AM process, such as a 3D printing technique or SLA. Alternatively, the annular collar may be produced as a discretely fabricated piece, which is subsequently bonded to the LRU housing by brazing, glass fritting, or utilizing another joinder technique creating a mechanically-robust, solder-free bond joint.

Embodiments of the avionic LRUs and, more generally, the LRU-containing aircraft systems also feature relatively high levels of design flexibility and modularity. In certain embodiments, a given avionic LRU may be produced to include two or more connector interfaces permitting the LRU to be operably interconnected with other LRUs in, for example, a stacked relationship. Such a multi-LRU architecture not only enhances the modularity of the LRU-containing aircraft systems, but further allows varying functions to be divided between different LRUs, as appropriate to best suit a particular application or usage. To provide a more specific example, in an embodiment in which an LRU-containing system includes at least first and second avionic LRUs, the first avionic LRU may contain microelectronic devices (e.g., semiconductor die on which control circuitry is formed) for performing processing or calculation tasks, while a second avionic LRU contains microelectronic devices for performing actuation functions supporting aircraft operation and/or sensing functions for monitoring one or more operational parameters pertaining to aircraft operation. An exemplary embodiment of such an multi-LRU aircraft system is further discussed below in conjunction with FIG. 4. First, however, a relatively simple LRU-containing aircraft system including a single avionic LRU is described in conjunction with FIGS. 1-3 to establish an exemplary context in which embodiments of the present disclosure may be better understood.

Example of Aircraft System and High Temperature Avionic LRU

FIG. 1 is an isometric view of an LRU-containing aircraft system 10, as illustrated in accordance with an exemplary embodiment of the present disclosure. In the present example, LRU-containing aircraft system 10 contains two components, namely, an avionic LRU 12 and a mating LRU receptacle 14. As indicated by arrow 16, avionic LRU 12 can be matingly connected, mounted, or attached to LRU receptacle 14. When so connected, LRU receptacle 14 physically supports avionic LRU 12, while enabling bidirectional or unidirectional signal communication between receptacle 14 and LRU 12. Signal communication will typically occur discrete physical contacts, terminals, or "hardwire" connections. Accordingly, and as more clearly shown in FIG. 2, avionic LRU 12 may include an LRU connector interface 18 having multiple terminals clustered or grouped as an LRU terminal array 20. Similarly, LRU receptacle 14 includes a receptacle connector interface 22 having a receptacle terminal array 24, which contains terminals numbered, sized, and spatially distributed to matingly engage LRU terminal array 20 when avionic LRU 12 is removably mounted to receptacle 14.

Figure 2:
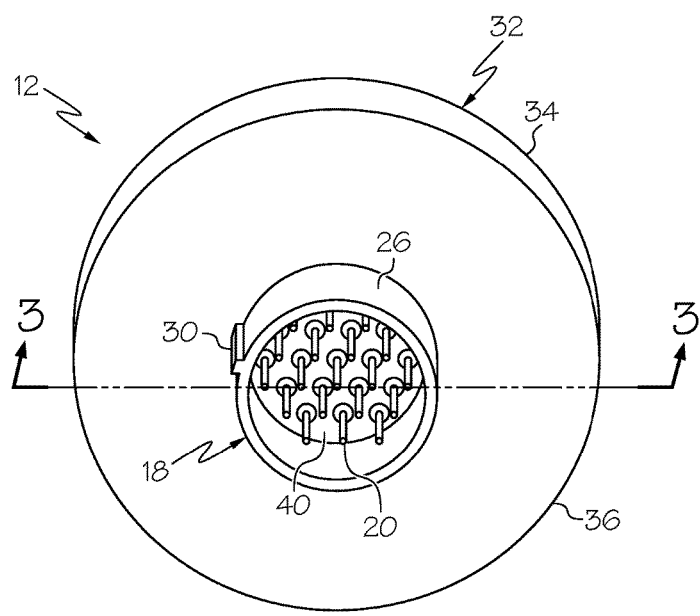
FIGS. 2 and 3 are bottom isometric and cross-sectional views, respectively, of the high temperature avionic LRU shown in FIG. 1.

In the embodiment of FIGS. 1-2, LRU terminal array 20 is realized as a multipin array, while receptacle terminal array 24 is realized as a multi-socket array. This example notwithstanding, various other types of terminals can be employed in alternative implementations. For example, in further embodiments, LRU terminal array 20 may contain electrically-conductive sockets (or, perhaps, a mixture of pins and sockets), while receptacle terminal array 24 contains electrically-conductive pins (or, perhaps, a mixture of pins and sockets). Moreover, signal communication between avionic LRU 12 and a mating LRU receptacle 14 need not occur over hardwire connections in all embodiments. Rather, in certain embodiments, avionic LRU 12 and LRU receptacle 14 may communicate over one or more wireless signal communication pathways, such as over optical signal pathways or, perhaps, wireless communications links utilizing, for example, short range RF communication. Power distribution to avionic LRU 12 may occur over hardwire connection and, specifically, through certain pin/socket pairs included in LRU terminal array 20 and receptacle terminal array 24. Additionally or alternatively, avionic LRU 12 may be partially or wholly powered through an integrated energy harvesting mechanism, such as a monopole-based, a vibration-based, or a differential temperature-based energy harvesting mechanism.

Connector interfaces 18, 22 further include corresponding structural features or "guide members," which matingly engage, pilot, or physically register when avionic LRU 12 is mounted to LRU receptacle 14. Such guide members are usefully designated to provide a secure mechanical coupling of avionic LRU 12 to LRU receptacle 14, while further ensuring proper alignment between corresponding terminals pairs (e.g., socket-pin pairs) of terminal arrays 20, 24. Interfaces 18, 22 can assume any form suitable for providing such functions. In the illustrated embodiment, and by way of non-limiting example, LRU connector interface 18 is fabricated to include a single, relatively large guide member in the form of an annular flange or collar 26, which projects from LRU housing 32. Annular collar 26 may extend parallel to and, perhaps, may be substantially coaxially with the centerline of LRU 12 (represented in FIG. 1 by dashed line 54). Comparatively, receptacle connector interface 22 is fabricated to include an annular cavity, groove, or depression 28, which has geometry generally conforming with that of annular collar 26. Annular collar 26 is thus matingly received within annular depression 28 when avionic LRU 12 is removably mounted to LRU receptacle 14 to provide a relatively robust mechanical coupling, while ensuring proper alignment between LRU 12 and receptacle 14 along LRU centerline 54. As a further benefit, annular collar 26 circumscribes or extends around LRU terminal array 20 to afford additional mechanical projection thereto.

If desired, LRU connector interface 18 and receptacle connector interface 22 may be produced to further include anti-rotation or clocking features, which cooperate to ensure the proper angular positioning of avionic LRU 12 with respect to LRU receptacle 14 about centerline 54 when LRU 12 is installed on receptacle 14. As a non-limiting example of such clocking features, LRU connector interface 18 is illustrated in FIGS. 1-2 as further including at least one longitudinal ridge or elongated key 30, which is formed on the inner or outer perimeter of annular collar 26 and which extends parallel to centerline 54. Correspondingly, LRU receptacle 14 includes an elongated slot or keyway 31 (FIG. 1), which is joined to and extends along annular depression 28 of receptacle 14. When avionic LRU 12 is installed on LRU receptacle 14, elongated key 30 is received within keyway 31 to ensure proper angular positioning between LRU 12 and receptacle 14 and, therefore, proper connection of the corresponding pin-socket pairs of terminal arrays 20, 24. In further embodiments, this structural arrangement may be reversed or various other types of anti-rotation or clocking features may be formed on interfaces 18, 22.

Avionic LRU 12 further includes an LRU enclosure, casing, or housing 32. In the illustrated example, LRU housing 32 has a relatively compact, substantially cylindrical form factor; although the geometry of LRU housing 32 will inevitably vary among embodiments depending upon intended LRU functionality, the number and type of microelectronic device or devices housed within LRU 12, and other such factors. LRU housing 32 includes a main housing body 34, 36 and a cover piece 38. As shown most clearly in FIG. 1, main housing body 34, 36 includes, in turn, a peripheral sidewall portion 34 and a cylindrical base wall 36. Peripheral sidewall portion 34 and cylindrical base wall 36 are preferably integrally formed as a single piece or monolithic structure; however, this is not necessary in all embodiments. Similarly, annular collar 36 may be integrally formed with base wall 36 or, instead, formed as discrete structure and bonded to base wall 36, as further described below.

With continued reference to FIGS. 1-2, and referring specifically to FIG. 2, LRU housing 32 further contains at least one electrically-routed housing wall 40. In this particular example, electrically-routed housing wall 40 is realized as a discrete structure, which installed within main housing body 34, 36 during assembly of LRU 12. Electrically-routed housing wall 40 bounds at least one internal cavity contained within LRU 12 (sealed cavity 42 shown in FIG. 3 and described below); and, thus, helps form a sealed enclosure in which the LRU-housed microelectronic device or devices are located. A portion of electrically-routed housing wall 40 is visible from the exterior of avionic LRU 12, when viewed along centerline 54 through annular collar 26. In certain embodiments, and as indicated in FIG. 2, the terminals (pins) of LRU terminal array 20 may be affixed to and extend from electrically-routed housing wall 40 for mating connection to the terminals (sockets) of receptacle terminal array 24, as previously described. Accordingly, when avionic LRU 12 is removably mounted to LRU receptacle 14 or another compatible LRU receptacle, housing wall 40 may be positioned immediately adjacent the LRU receptacle as taken along LRU centerline 54. Additional description of electrically-routed housing wall 40 and the internal features of avionic LRU 12 will now be set-forth in conjunction with FIG. 3, noting that housing wall 40 may be integrally formed with and serve as cylindrical base wall 36 in alternative implementations of LRU 12.

Figure 3:
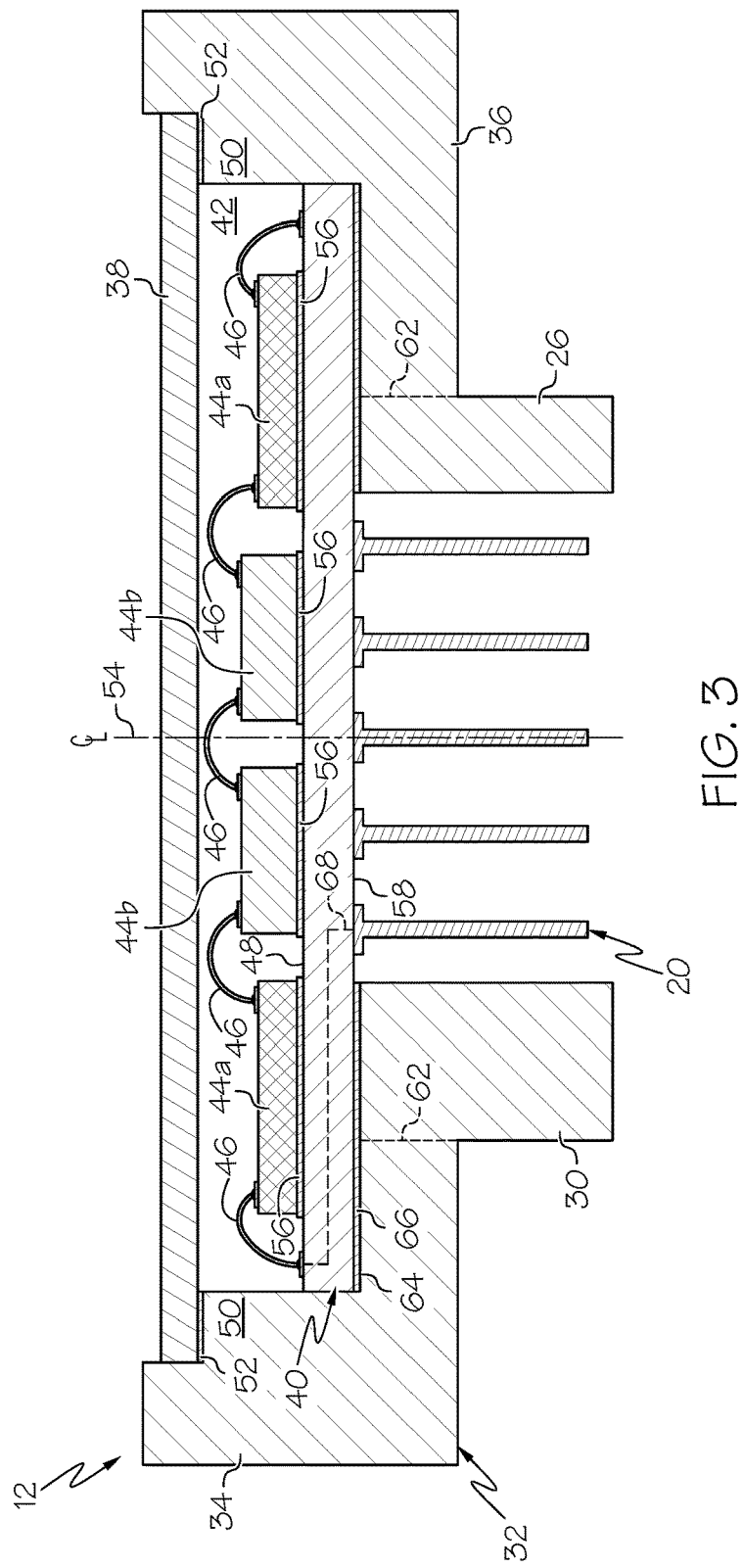

FIG. 3 is a cross-sectional view of avionic LRU 12, as taken along section plane 3-3 identified in FIG. 2. Here, it can be seen that LRU housing 32 contains an inner cavity 42 in which a number of microelectronic devices 44 are located. Specifically, the illustrated portion of avionic LRU 12 contains four microelectronic devices 44: two microelectronic die 44(a) and two passive devices 44(b). Microelectronic die 44(a) may carry MEMS devices, ASICs, optical devices, or the like. Passive devices 44(b), by comparison, may assume the form of diodes, capacitors, resistors, inductors, or the like. In the illustrated embodiment, passive devices 44(b) are selected as so-called "wirebondable" passive devices, which feature bond pads formed on their respective frontsides to which wirebonds may be bonded. In alternative embodiments, passive devices 44(b) may assume other forms, such as that of SMDs having electrically-conductive end terminals. Wirebonds 46 are utilized to form the desired connections between devices 44 and the terminals or bond pads provided on an interior principal surface or frontside 48 of electrically-routed housing wall 40 in the illustrated embodiment; however, other interconnection techniques can be employed in further implementations. For example, in certain instances, a 3D printing process, such as a computer-controlled ink jet process, may be utilized to apply an electrically-conductive (e.g., metal particle containing) ink, which is then cured to yield the desired interconnects. More generally, the number, type, and relative disposition of microelectronic devices 44 contained within LRU 12 will vary amongst embodiments in relation to the particular functionality and design of LRU 12.

To sealingly enclose inner cavity 42, cover piece 38 may be bonded to a peripheral shelf or ledge 50 provided around the upper open end of LRU housing 32. As shown in FIG. 3, a ring-shaped layer of bonding material 52 may be disposed between cover piece 38 and peripheral ledge 50 of main housing body 34, 36 to form the desired bond. Cover bond layer 52 may extend fully around the centerline of LRU 12 (again, represented by dashed line 54) to form a continuous, 360° seal between cover piece 38 and main housing body 34, 36. In certain embodiments, cover bond layer 52 may form a hermetic or near hermetic seal around the periphery of cavity 42, which may contain air or an inert gas, such as argon. In other embodiments, the seal formed between inner cavity 42 and the ambient environment may not be hermetic, as strictly defined, but rather may be a low leakage seal having a gross leakage rate falling within acceptable parameters. Generally, as appearing herein, inner cavity 42 is considered "hermetically sealed" or is considered to have a "hermetic seal" formed therearound when little to no leakage (bubbles) are observed from the cavity's exterior when the cavity is filled with air or another gas and the air cavity package is fully immersed in a liquid (e.g., perfluoropolyether) at approximately 125° C.

In certain implementations of avionic LRU 12, cover bond layer 52 may be composed of an organic pressure-sensitive adhesive, such as a high temperature epoxy. Cover bond layer 52 is, however, usefully formulated to predominately contain inorganic materials by wt % and/or to form a hermetic seal around inner cavity 42, as previously defined. In instances in which cover bond layer 52 provides a hermetic seal around inner cavity 42, the material from which cover bond layer 52 is formed may be considered a "hermetic bonding material." Examples of hermetic bonding materials, which are predominately composed of inorganic materials by wt % and which are suitable for forming cover bond layer 52 include ceramic bonding materials, glass bonding materials, metallic bonding materials, and combinations thereof. While predominately composed of inorganic materials, cover bond layer 52 may or may not contain lesser of organic materials added to enhance tailored properties of bond layer 52. For example, in certain instances, cover bond layer 52 may contain limited amounts of an epoxy added to enhance the fracture resistance or pliability of bond layer 52. Conversely, in other embodiments, which may be particularly beneficial from a high temperature performance perspective, cover bond layer 52 may be essentially free of organic materials and, perhaps, consist essentially of metals, ceramics, or glass constituents, or a combination thereof.

Processes suitable for forming cover bond layer 52 from metallic bonding materials include the following. In a first exemplary approach, a coating precursor material containing metallic particles is applied at the juncture of cover piece 38 and main housing body 34, 36, and then transformed into bond layer 52 via a metal sintering process involving the application of heat and/or pressure. In a second exemplary approach, cover bond layer 52 is produced by positioning a metallic (e.g., KOVAR™) frame, which is trimmed or otherwise formed to a suitable planform geometry, between cover piece 38 and inner peripheral ledge 50 of main housing body 34, 36. Heat and/or pressure is then applied to create the desired (e.g., hermetic) bond between cover piece and housing body 34, 36. In other implementations, cover bond layer 52 may be formed from a non-metallic hermetic bonding material, which is predominately composed of ceramic or glass materials by wt %. In this case, a glass frit bond sealing technique may be employed to form cover bond layer 52 when desirably formed from a glass bonding material. For example, in one approach, a paste or other material containing glass particles may be applied as a precursor layer. The glass particle-containing precursor layer may then be densified by the application of heat and/or pressure to form bond layer 52. Various different glass particle types can be selected for such a process, with borosilicate particles being a suitable example. Any organic materials, such as binders, dispersants, carrier fluids, or the like, may be partially or wholly thermally decomposed during the densification process. As indicated above, the resulting glass bond layer may contain lesser amounts of inorganic materials or, instead, may be essentially free of organic materials.

With continued reference to FIG. 3, a plurality of device bond layers 56 attach microelectronic devices 44 to electrically-routed housing wall 40. Device bond layers 56 may join microelectronic devices 44 to the upper principal surface or frontside 48 of electrically-routed housing wall 40, which is substantially opposite backside 58 of wall 40 from which the terminals (pins) of LRU terminal array 20 project.

Notably, the foregoing description of cover bond layer 52 is equally applicable to the bond layers utilized to attach microelectronic devices 44 to electrically-routed housing wall 40. Thus, device bond layers 56 can be composed of organic materials, such as pressure-sensitive epoxies and other organic die attach materials, which are deposited (e.g., via stencil printing, needle dispense, or the like) onto frontside 48 of housing wall 40 in embodiments. Alternatively, device bond layers 56 can be composed of inorganic bond materials, such as metallic, ceramic, or glass bond materials of the type described above. In this latter case, device bond layers 56 may be principally composed of inorganic materials by wt % and, perhaps, may be essentially free of organic materials in at least some embodiments of LRU 12. Again, such layers may be formed by initially applying bond layer precursor materials in either a dry state (e.g., as a free standing film) or a wet state (e.g., as a paste, paint, slurry, or the like) and then further processing the precursor materials (e.g. by the application of heat and/or pressure) to yield the final device bond layers.

In certain embodiments, annular collar 26 and main housing body 34, 36 may be produced from multiple discretely-fabricated pieces, which are subsequently joined during assembly of LRU housing 32. For example, as indicated in FIG. 3 by dashed line 62, annular collar 26 may be produced as a separate piece, which is joined to main housing body 34, 36 and/or electrically-routed housing wall 40 by brazing, glass fritting, or utilizing a metallic bond material of the type described above. Alternatively, main housing body 34, 36 and collar 26 may be integrally formed as a single piece or part. In this latter case, main housing body 34, 36 and collar may be produced from a single piece of dielectric material, such as a machinable ceramic (e.g., MACOR™) block, which is machined to define cavity 42 and the other features of LRU housing 32. As a still further possibility, main housing body 34, 36 and collar 26 can be produced utilizing an AM process. The term "AM process," as appearing herein, defined as a computer-controlled manufacturing processes during the relevant structure (e.g., main housing body 34, 36 and collar 26) are gradually built-up or compiled on a layer-by-layer basis in accordance with computer-readable AM design data, such as a CAD model. Suitable AM processes include 3D printing process, such as SLA, FFF, and laser sintering (e.g., DMLS) processes. In one implementation, main housing body 34, 36 and collar 26 are integrally formed as a single piece from a suitable dielectric material, such as a high strength ceramic, utilizing a DMLS process.

Electrically-routed housing wall 40 can likewise be integrally formed with main housing body 34, 36 and/or collar 26, as permitted by the LRU design and the manufacturing techniques utilized to fabricate LRU 12. Alternatively, electrically-routed housing wall 40 may be produced as a discrete component, which is subsequently installed in cavity 42 during LRU assembly. This latter approach may advantageously tenable device mounting, interconnection, and testing prior to positioning electrically-routed housing wall 40 within cavity 42. Thus, in such embodiments, housing wall 40, microelectronic devices 44, and wirebonds 46 may form a microelectronic device module, which can be preassembled, tested, and then inserted into or "dropped in" LRU housing 32 prior to attachment of cover piece 38. Electrically-routed housing wall 40 may be joined to an internal ledge or shelf 64 located within main housing body 34, 36 by a ring of bonding material 66. Bonding material ring 66 may extend around LRU terminal array 20, as taken about LRU centerline 54. Bonding material ring 66 may be formed from any of the various bonding materials set-forth herein. Accordingly, bonding material ring 66 may be formed to create a hermetic seal or bond joint between housing wall 40 and main housing body 34, 36, in at least some embodiments of LRU 12. Additionally, bonding material ring 66 may be predominately composed of inorganic materials (e.g., one or more metallic, glass, or ceramic constituents) by wt %, and, perhaps, may be essentially free of organic materials. Such bonding materials may be applied to shelf 64 or an outer peripheral area of backside 58 during LRU manufacture utilizing, for example, a wet state or dry state (film transfer) application process. In another approach, a metallic (e.g., a KOVAR™ frame) may be utilized to form the desired bond between electrically-routed housing wall 40 and main housing body 34, 36. In still further embodiments, bonding material ring 66 may be formed from an organic bonding materials, such as a high temperature epoxy.

Regardless of whether realized as a discretely-fabricated piece or integrally formed with base wall 36 of main housing body 34, 36, electrically-routed housing wall 40 is usefully fabricated to include electrically-conductive routing features, such as metal (e.g., Cu) traces, filled or plated vias, and the like. The routing features of housing wall 40 provide the desired interconnections between microelectronic devices 44 and the terminals (e.g., pins) of LRU terminal array 20. In various embodiments, electrically-routed housing wall 40 may be produced as a layered structure comprised of multiple dielectric (e.g., ceramic) layers interleaved with multiple electrically-conductive (e.g., metal) levels. Interconnect lines may be formed within electrically-routed housing wall 40 and/or on frontside 48 of wall 40 to electrically connect the terminals (e.g., bond pads) located on wall frontside 48 with the terminals of array 20. One such interconnect features is shown in the cross-section of FIG. 3, as generically represented by dashed line 68. Housing wall 40 is usefully fabricated to contain ceramic and metallic materials, while being essentially free of organic materials. In such embodiments, electrically-routed housing wall 40 may be capable of maintaining high levels of structural integrity at highly elevated temperatures (e.g., temperatures approaching or exceeding 225° C.) and pronounced thermal cycling in contrast to PWBs and other routing substrates composed of hygroscopic organic materials.

In certain embodiments, a tape casting process may be employed in the fabrication of electrically-routed housing wall 40 and, perhaps, in the manufacture of LRU housing 32 generally. By way of generalized example, tape casting may entail the production of multiple ceramic materials are from a powdered ceramic materials, which are cut, stacked, laminated, and then sintered to gradually build-up housing wall 40, as generically shown in FIG. 3. Additional layers may also be applied, as appropriate, to produce the other walls of LRU housing 32 and/or annular collar 26 when such features are desirably integrally formed with electrically-routed housing wall 40. Concurrently with this layer-by-layer buildup process, electrically-conductive interconnect features, such as metal (e.g., Cu) traces and electrically-conductive vias, are formed between and through the layers to create the desired wiring structure in and on housing 40, as suitable to electrically interconnect devices 44 and terminal array 20 upon completion of avionic LRU 12. This example notwithstanding, various other manufacturing approaches can be utilized to produce electrically-routed housing wall 40 in further embodiments, such as process similar to those utilized in the fabrication of co-fired MCM ceramic substrates.

There has thus been described an exemplary embodiment of an avionic LRU providing enhanced reliability over prolonged operation at highly elevated temperatures and under relatively severe thermal cycling conditions. By eliminating or reducing the usage of organic materials, by eliminating or decreasing reliance on solder interconnections within LRU 12, and/or by providing high integrity hermetic or near hermetic sealing of cavity 42, the temperature capabilities of LRU 12 can be enhanced. As a result, embodiments of LRU 12 may be capable of prolonged operation at ambient temperatures and juncture temperatures approach or exceeding 175° C. and 225° C., respectively. In the above-described example, LRU-containing aircraft system 10 (FIG. 1) includes a single high temperature avionic LRU (i.e., LRU 12 shown in FIGS. 1-3). In more complex embodiments, the LRU-containing aircraft system may include a greater number of high temperature avionic LRUs, which may be interconnected and spatially disposed in various different arrangements. Additional discussion in this regard will now be provided in conjunction with FIG. 4.

Figure 4:
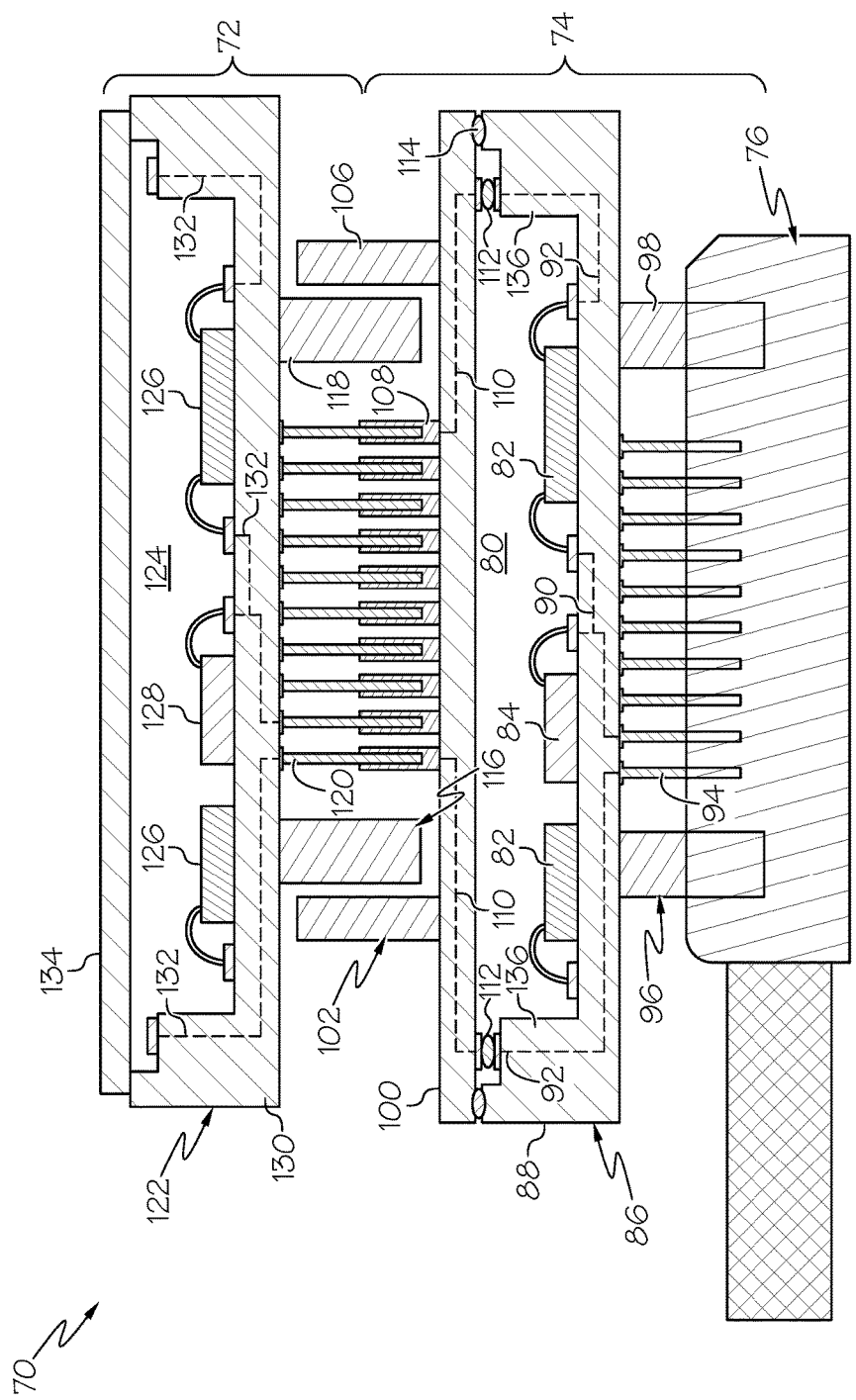
FIG. 4 is a cross-sectional view of an LRU-containing aircraft system, which includes an LRU receptacle and multiple avionic LRUs disposed in an operably-interconnected, stack relationship, as illustrated in accordance with a further exemplary embodiment of the present disclosure.

FIG. 4 is a cross-sectional view of a multi-LRU aircraft system 70, as depicted in accordance with a further exemplary embodiment of the present disclosure. As can be seen, multi-LRU aircraft system 70 includes a first high temperature avionic LRU 72, a second high temperature avionic LRU 74 disposed in a stacked with LRU 72, and an LRU receptacle 76. For ease of reference, LRUs 72, 74 are referred to as "upper avionic LRU 72" and "lower avionic LRU 74," respectively; this terminology utilized in a non-limiting sense with the understanding that LRUs 72, 74 and, more generally, multi-LRU aircraft system 70 may assume any orientation in three dimensional space in actual usage. While including two LRUs disposed in a stacked relationship in the illustrated example, multi-LRU aircraft system 70 can include a greater number of LRUs in further embodiments. In many respects, lower avionic LRU 74 shown in FIG. 4 is similar to avionic LRU 12 shown in FIGS. 1-3. As does LRU 12, LRU 74 includes an LRU housing 78 containing an inner (e.g., hermetically-sealed) cavity 80 in which a number of interconnected microelectronic devices 82, 84 are located; here, two microelectronic die 82 and a passive device 84. Microelectronic devices 82, 84 are mounted to an electrically-routed carrier or housing wall 86. Electrically-routed housing wall 86 forms a lower portion of LRU housing 78 in its substantial entirety and further forms peripheral sidewall portion 88 of LRU housing 78, which extends around and peripherally bounds inner cavity 80. Additionally, sidewall portion 88 of housing 78 may also be fabricated to also include certain interconnect features enabling electrical interconnection with a topside connector array.

As generically represented by dashed lines in FIG. 4, electrically-routed housing wall 86 is fabricated to contain routing features 90, 92. Routing features 90 electrically couple devices 82, 84 to a number of terminals, such as pins or sockets, forming a first LRU connector array 94. LRU connector array 94 is included in a lower connector interface 96, which further contains one or more guide members; e.g., an annular collar 98 similar or identical to annular collar 26 described above in conjunction with FIGS. 1-3. When LRU 74 is installed on LRU receptacle 76, annular collar 98 may be matingly received in an annular groove or depression formed in receptacle 76 to position the terminals (e.g., pins) of LRU connector array 94 with respect to the non-illustrated receptacle terminals in the manner previously described. Electrically-routed housing wall 86 may contain one or more ceramic layers on which or in which electrically-conductive features (e.g., metal traces and vias) are formed to provide the desired electrical connections 92 between devices 82, 84 and the terminals of LRU connector array 94.

As was the case with cavity 42 of avionic LRU 12 (FIGS. 1-3), inner cavity 80 is usefully hermetically sealed utilizing a cover piece or lid. However, in contrast to avionic LRU 12 in which a cover piece 38 lacking routing features is utilized to sealingly enclose cavity 42, inner cavity 80 is enclosed by a second electrically-routed housing wall or cover piece 100 in the embodiment of FIG. 4. A second LRU connector interface 102 projects upwardly from cover piece 100 in a direction opposite lower LRU connector interface 96. As does lower LRU connector interface 96, upper LRU connector interface 102 includes an annular collar 106 and a terminal array 108. To provide electrical interconnection with terminals 108 of upper LRU connector array 102, electrically-routed cover piece 100 is produced to include a number of interconnect features 110. Interconnect features 110 may electrically connect terminals 108 with corresponding contact features (e.g., bond pads) present on the underside of cover piece 100.

Electrical interconnection between corresponding interconnect features present at the interface of the upper peripheral edge or sidewall of electrically-routed housing wall 86 and the outer peripheral edge of electrically-routed cover piece 100 can be achieved utilizing various different electrically-conductive bonding materials. In certain embodiments, an electrically-conductive epoxy may be utilized; however, as previously indicated, it is generally preferred to eliminate organic materials from the LRU architecture, in whole or in part. Thus, as indicated in FIG. 4, corresponding contact points (here, bond pads) may be joined utilizing a metallic bonding material 112, such as a sintered bonding material, such as a silver sinter material, in the illustrated example. Additionally, an outer bonding ring 114 may be formed around an outer peripheral portion of the interface between housing wall 86 and cover piece 100 to further create a high integrity, low leakage seal enclosing cavity 80. In embodiments, bonding ring 114 may be composed of a glass frit or metallic bond material of the type discussed above, which may or may not be essentially free of organic materials. Bonding ring 114 may extend fully around the periphery of LRU 74 to attach cover piece 100 to electrically-routed housing wall 86 and sealingly enclose cavity 80.

Upper LRU connector interface 102 permits physical mounting and electrical coupling of lower avionic LRU 74 with upper avionic LRU 72, which includes a compatible LRU connector interface 116. Connector interface 116 of upper avionic LRU 72 also include one or more mating guide features, such as an annular collar 118, and a corresponding plurality of terminals 120 (e.g., pins or sockets) for electrical engagement with terminals 108 of LRU connector interface 102. In the illustrated example, upper avionic LRU 74 has a construction that is similar to lower avionic LRU 74. Correspondingly, upper avionic LRU 72 also includes an LRU housing 122 containing a sealed chamber or inner cavity 124. A number of microelectronic devices 126, 128 (here, two die 126 and one passive device 128) are located within cavity 124 and supported by an electrically-routed housing wall 130. Housing wall 130 partially defines cavity 124 and contains routing features 132, which electrically interconnect devices 126, 128 with terminals 120. Finally, a lid or cover piece 134 is further sealingly positioned over the open upper end of LRU housing 122 to sealingly enclose upper cavity 120. In contrast to lower avionic LRU 74, cover piece 134 lacks an additional connector interface and routing features. However, in further embodiments, cover piece 134 can be replaced by an electrically-routed cover piece similar to cover piece 100 to permit further stacking of LRU modules, as desired.

There has thus been described an embodiment of a multi-LRU aircraft system containing multiple avionic LRUs, which can be matingly interconnected in, for example, a stacked relationship. In this manner, complementary functionalities can be distributed between different LRUs in the multi-LRU aircraft system to provide higher levels of modularity; e.g., in the exemplary embodiment of FIG. 4, microelectronic devices 82, 84 contained within lower avionic LRU 74 may provide processing or calculation tasks, while devices 126, 128 may perform sensing or actuation functions related to aircraft operation. To enable such interconnection, embodiments of the avionic LRUs may be imparted with multiple connector interfaces; and, in such embodiments, electrical communication pathways may extend between the LRU housing body (as wholly or partially formed from one or more electrically-routed housing walls) and the cover piece or lid positioned over the housing body to sealingly enclose the inner cavity or cavities in which the LRU-housed microelectronic device(s) are located. In the above-described example, such electrical interconnections at the housing-cover interface are provided via metal (e.g., sintered silver) connections created between corresponding bond pads provided on a bond pad shelf of the housing body (identified in FIG. 4 by reference numeral "136") and the underside of the electrically-routed cover piece, such as cover piece 100 shown in FIG. 4. In alternative embodiments of the avionic LRUs, various other interconnection features may be utilized. To help further emphasize this point, an additional example of a high temperature avionic LRU will now be described in conjunction with FIG. 5.

Figure 5:
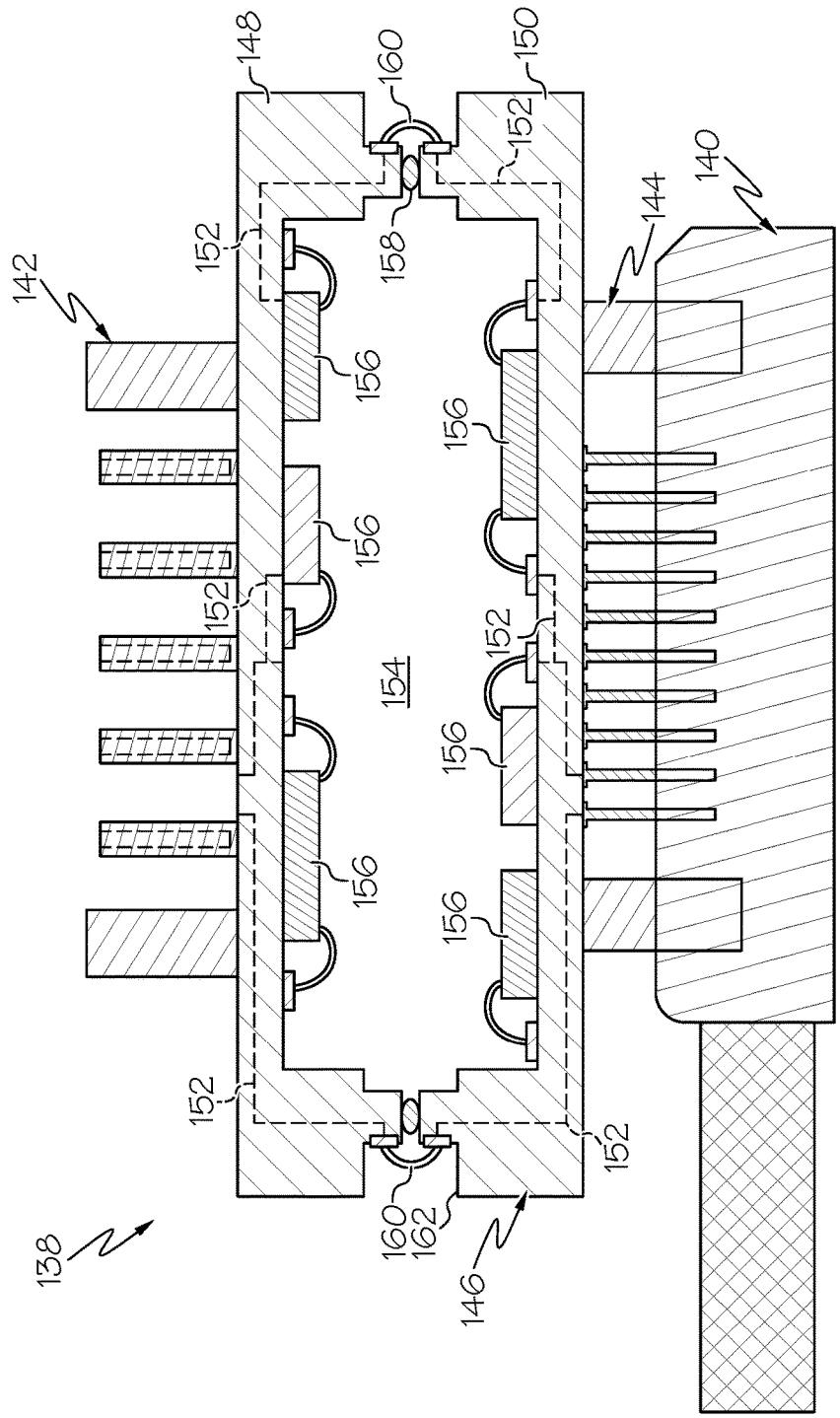
FIG. 5 is a cross-sectional view of an LRU-containing aircraft system, which includes an LRU receptacle and at least one avionic LRU, as illustrated in accordance with a still further exemplary embodiment of the present disclosure.

Turning now to FIG. 5, an avionic LRU 138 mounted to compatible LRU receptacle 140 is depicted in accordance with a still further exemplary embodiment of the present disclosure. As can be seen, LRU 138 includes first and second connectors interfaces 142, 144, which may be similar or identical to connector interfaces 96, 102 described above in conjunction with FIG. 4 and which extend from opposing sides of LRU housing 146. In this example, LRU housing 146 is formed from two principal halves 148, 150, which may or may not be substantially identical. Housing halves 148, 150 each contain electrically-conductive routing features 152, help define or bound sealed cavity 154, and support a number of attached microelectronic devices 156. Consequently, housing halves 148, 150 may each be considered "electrically-routed housing walls" of the type described herein.

A ring of bonding material 158 is formed between and joins housing halves 148, 150 to sealingly enclose cavity 154. As previously indicated, bonding material ring 158 is advantageously, although not essentially formed from an inorganic material, such as a metallic bonding material or a glass-based bonding material of the type previously described. Wirebonds 160 rather than sintered metal bodies are formed to electrically interconnect corresponding contact points (e.g., bond pads) provided at the interface of housing halves 148, 150. Wirebonds 160 thus provide the desired electrical interconnections between the terminals of interfaces 142, 144, electrical routing features 152, and microelectronic devices 156. If desired, and as further indicated in FIG. 5, wirebonds 160 may be recessed in a circumferential cavity or groove 162 for added mechanical protection. Such a connection interface may enable in-filed separation of housing halves 148, 150, when appropriate, to facilitate maintenance and repair. Additionally, the design of LRU 138 may enable one module half to be a common core computing module, while the other module half is realized as, for example, an analog input-output module.

Conclusion

Multiple embodiments of avionic LRUs capable of providing enhanced reliability over prolonged operation across repeated thermal cycling and at highly elevated operating temperatures have thus been provided. Through the incorporation of connector guide features into the LRU housing, the elimination of organic bonding materials, and/or through the usage of electrically-routed housing walls, the propensity of the resulting LRU for high temperature failure may be decreased as compared to conventional LRUs. Concurrently, the size, weight, and complexity of the LRU may be decreased. In embodiments, the avionic LRU may contain an electrically-routed housing wall, which includes electrically-conductive routing features electrically coupling one or more housed microelectronic devices to the terminals of an externally-accessible LRU terminal array. Additionally, the electrically-routed housing wall may also include an inorganic dielectric (e.g., ceramic) body in which the electrically-conductive routing features are at least partially embedded. Embodiments of the avionic LRUs and, more generally, the LRU-containing aircraft systems described herein further provide relatively high levels of design flexibility or modularity. For example, multi-LRU architectures enabling LRUs having multiple connector interfaces to be interconnected in stacked relationship have been disclosed. This enhances the modularity of the resulting LRU-containing aircraft systems and allows different functions (e.g., processing, sensing, and/or actuation) to be divided between LRUs, as best suited for a particular application or usage.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. An avionic Line Replaceable Unit (LRU) configured to be removably mounted to an avionic LRU receptacle having a receptacle connector interface and a receptacle terminal array, the LRU comprising:
 a microelectronic device;
 an LRU housing, comprising:
  an inner cavity within which the microelectronic device is located; and
  an electrically-routed housing wall bounding a portion of the inner cavity and to which the microelectronic device is bonded;
 an LRU connector interface projecting from the LRU housing and having a first LRU terminal array electrically coupled to the microelectronic device through the electrically-routed housing wall, the LRU connector interface configured to matingly engage the receptacle connector interface when the avionic LRU is removably mounted to the avionic LRU receptacle.

2. The avionic LRU of claim 1 wherein the electrically-routed housing wall comprises:
    a first principal surface to which the microelectronic device is bonded; and
    a second principal surface opposite the first principal surface as taken along a centerline of the avionic LRU, the first LRU terminal array extending from the second principal surface of the electrically-routed housing wall.

3. The avionic LRU of claim 2 wherein the LRU connector interface comprises an annular collar extending around the first LRU terminal array, as taken about the centerline of the avionic LRU.

4. The avionic LRU of claim 3 wherein the annular collar terminates adjacent and extends away from the second principal surface of the electrically-routed housing wall along the centerline of the avionic LRU.

5. The avionic LRU of claim 1 wherein the LRU housing comprises:
    a main housing body bounding a periphery of the inner cavity and having an open end portion; and
    a cover piece positioned over the open end portion to sealingly enclose the inner cavity.

6. The avionic LRU of claim 5 further comprising a bond layer joining the cover piece to the main housing body and forming a hermetic seal therebetween, the bond layer composed predominately of inorganic materials by weight.

7. The avionic LRU of claim 6 wherein the bond layer is essentially free of organic materials.

8. The avionic LRU of claim 1 wherein the LRU housing comprises a main housing body bounding a periphery of the inner cavity; and
    wherein the LRU connector interface comprises a guide member projecting from the main housing body in a direction away from the electrically-routed housing wall, the LRU connector interface physically engaging the receptacle connector interface when the avionic LRU is removably mounted to the avionic LRU receptacle.

9. The avionic LRU of claim 8 wherein the guide member and the main housing body are integrally formed as a single ceramic structure.

10. The avionic LRU of claim 1 wherein the LRU housing comprises a main housing body bounding a periphery of the inner cavity, the main housing body having an inner annular ledge on which the electrically-routed housing wall seats.

11. The avionic LRU of claim 10 further comprising a bond layer joining the electrically-routed housing wall to inner annular ledge and forming a hermetic seal therebetween, the bond layer composed predominately of at least one inorganic material by weight.

12. The avionic LRU of claim 1 wherein the electrically-routed housing wall comprises:
    electrically-conductive routing features electrically coupling the microelectronic device to the first LRU terminal array; and
    an inorganic dielectric body in which the electrically-conductive routing features are at least partially embedded.

13. The avionic LRU of claim 1 further comprising a second LRU connector interface located substantially opposite the first LRU connector interface as taken along a centerline of the avionic LRU.

14. An avionic Line Replaceable Unit (LRU), the LRU comprising:
    a microelectronic device;
    an LRU housing enclosing a hermetically-sealed cavity in which the microelectronic device is located;
    an LRU connector interface projecting from the LRU housing and having a LRU terminal array electrically coupled to the microelectronic device; and
    a ceramic carrier containing electrical routing features electrically coupling the microelectronic device to the LRU terminal array, the ceramic carrier forming a wall of the LRU housing.

15. The avionic LRU of claim 14 wherein the ceramic carrier comprises:
    an inner principal surface to which the microelectronic device is bonded; and
    an outer principal surface from which the LRU terminal array projects.

16. The avionic LRU of claim 15 wherein the LRU connector interface further comprises an annular collar circumscribing the LRU terminal array and extending away from the outer principal surface substantially parallel to the LRU terminal array.

17. The avionic LRU of claim 15 further comprising a bonding material joining the annular collar to the outer principal surface of the ceramic carrier, the bonding material predominately composed of at least one inorganic material by weight.

18. The avionic LRU of claim 13 wherein the LRU housing further comprises:
    an upper edge portion;
    a cover piece positioned over the upper edge portion to sealingly enclose the hermetically-sealed cavity; and
    a hermetic bonding material joining the upper edge portion to the cover piece, the hermetic bonding material essentially free of organic materials.

19. A Line Replaceable Unit (LRU) containing aircraft system, comprising:
    a first avionic LRU, comprising:
        a LRU housing containing an inner cavity and an electrically-routed housing wall, which bounds a portion of the inner cavity;
        a first microelectronic device contained in the inner cavity and mounted to the electrically-routed housing wall; and
        a first LRU terminal array electrically coupled to the first microelectronic device through the electrically-routed housing wall; and
    a second avionic LRU configured to be removably mounted to the first LRU, the second LRU comprising:
        a second microelectronic device; and
        a second LRU terminal array electrically interconnected with the first LRU terminal array when the second avionic LRU is removably mounted to the first avionic LRU.

20. The LRU-containing aircraft system of claim 19 wherein the first microelectronic device comprises a semiconductor die on which control circuitry is formed, and wherein the second microelectronic device comprises one or more of the group consisting of avionic actuators and avionic sensors.

* * * * *